Aug. 30, 1938. H. M. McDONALD Re. 20,841

REINFORCED VENTILATED UNDERGARMENT

Original Filed Nov. 20, 1936 2 Sheets-Sheet 1

Inventor:
H. M. McDonald,
by Wm. F. Freudenreich,
Atty.

Aug. 30, 1938. H. M. McDONALD Re. 20,841

REINFORCED VENTILATED UNDERGARMENT

Original Filed Nov. 20, 1936 2 Sheets-Sheet 2

Inventor:
H. M. McDonald,
by Wm. F. Freudenreich,
Atty

Reissued Aug. 30, 1938

Re. 20,841

UNITED STATES PATENT OFFICE 20,841

REINFORCED VENTILATED UNDERGARMENT

Herman M. McDonald, Evanston, Ill., assignor to MacDee Company, a corporation of Illinois Original No. 2,114,268, dated April 12, 1938, Serial No. 111,901, November 20, 1936. Application for reissue June 16, 1938, Serial No. 214,173

10 Claims. (Cl. 128—159)

It is common to provide undergarments, such as trunks, with front reinforcing means. This necessitates a multiplication of layers of cloth which causes the garment to be too warm and stuffy in the reinforced areas. The object of the present invention is to produce a simple and novel reinforcing means of this general character, which not only serves the main purpose but makes the garment cool and airy.

In carrying out my invention, I preform a reinforcing device which may be inserted bodily as an inner layer or lining of a garment, either in the course of manufacture of the latter, or afterwards. Since the garment and the reinforcement are two independent units that are brought together, each may be fashioned in order best to serve its intended purpose. In other words, the garment may be built in a manner to provide a smooth, comfortable fit, whereas the reinforcing device may be given the shape or configuration that will make it serve most advantageously as a supporter.

Therefore, viewed in one of its aspects, the present invention may be said to have for its object to provide an undergarment of the trunk type with a reinforcing means which will enable the one to fit as smoothly as would an unreinforced garment and the other to serve effectively as a supporter.

Since the supporting or reinforcing element is first made as a preformed unit, the present invention may be regarded in one of its aspects, as having for its object to produce a device of novel construction adapted to serve as a supporter.

In the preferred construction, the reinforcing member is provided with a large open-work or perforated ventilating section so located that it extends upwardly from the crotch at the front of the garment. The body of the garment may be cut away in registration with this ventilating section and be stitched to the supporter around the edge of the latter; in this way leaving throughout a substantial area in the front of the garment a large section comprising only a single layer of material which constitutes an effective ventilator in the garment proper, without regard to any supporter.

Therefore, viewed in one of its aspects, my invention may be said to have for its object to produce a garment of the character described which shall contain a large perforated section located so as satisfactorily to serve as a ventilator.

Figure 1:
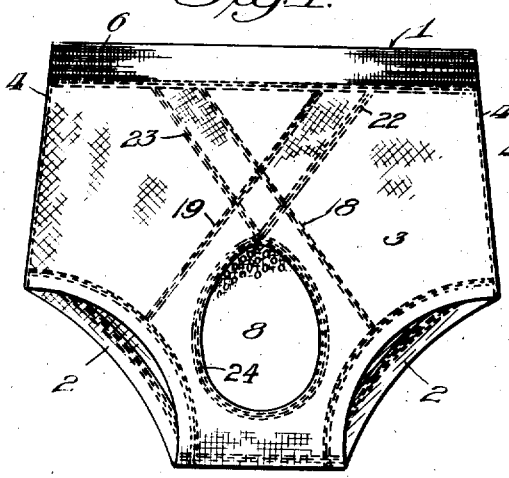
Figure 2:
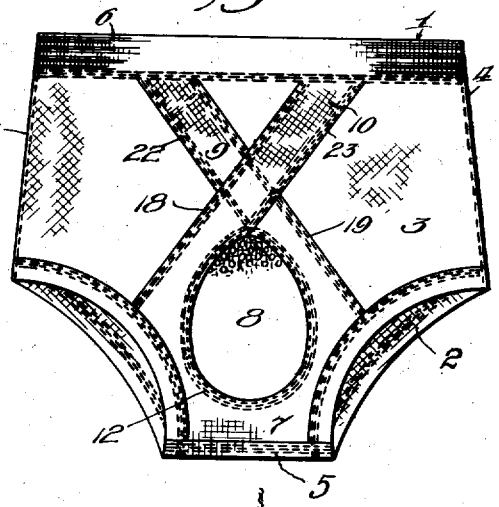
Figure 3:
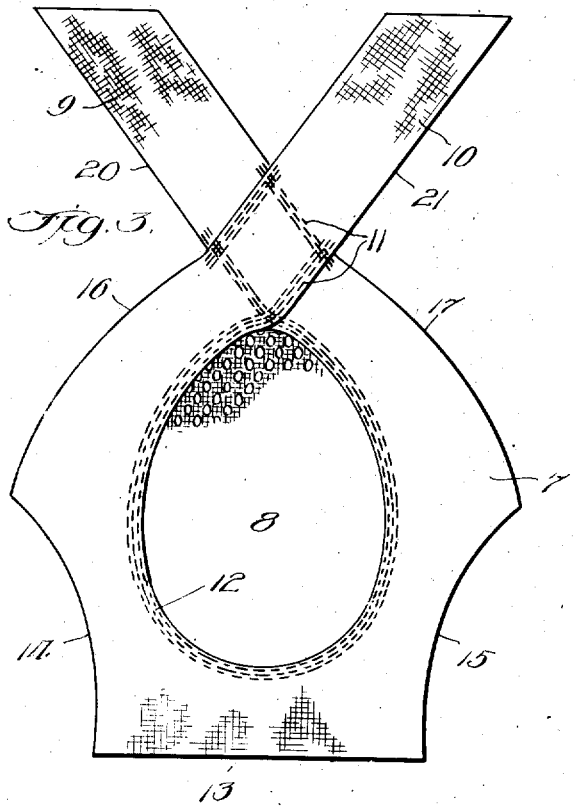
Figure 4:
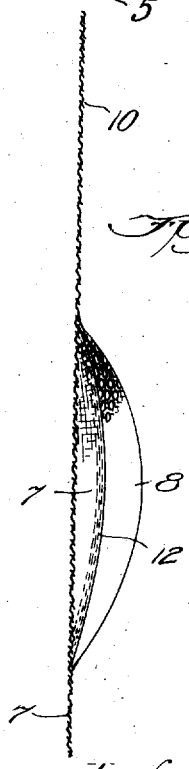
Figure 5:
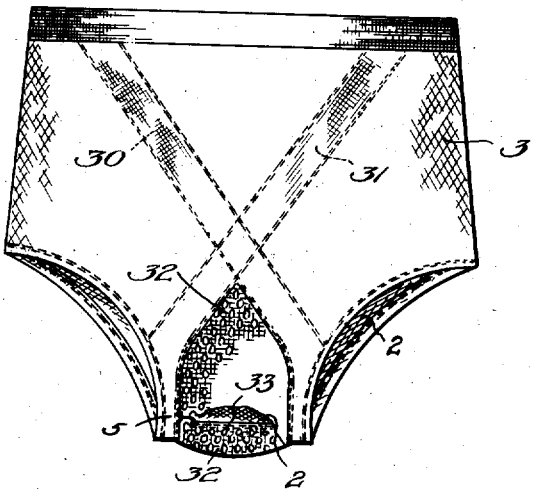
Figure 6:
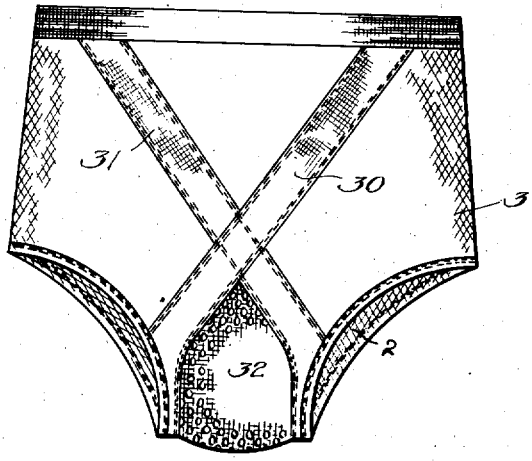
Figure 7:
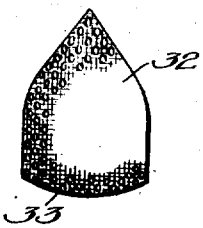

The various features of novelty whereby my invention is characterized will hereinafter be pointed out with particularity in the claims; but, for a full understanding of my invention and of its objects and advantages, reference may be had to the following detailed description taken in connection with the accompanying drawings, wherein:

Figure 1 is a front view of a garment embodying the present invention; Fig. 2 is a view, similar to Fig. 1, the garment being shown turned inside out; Fig. 3 is a plan view, on a larger scale, of the reinforcing device and supporter detached from the garment; Fig. 4 is an edge view of the device shown in Fig. 3; and Figs. 5 and 6 are views similar to Figs. 1 and 2, illustrating a modification; Fig. 7 is a front view of the ventilator, of the modified form of garment shown in Figs. 5 and 6, and detached therefrom.

Referring to the drawings, 1 represents a garment of the trunk type, made from any suitable material, conveniently material that is woven or knitted. In the arrangement shown, the garment is composed of two pieces, a rear section 2 and a front section 3, joined together at opposite sides by means 4 and at the crotch by a seam 5; there being an elastic waist band 6 around the top or the waistline of the garment.

In the particular arrangement illustrated in Figs. 1 to 4, there is a reinforcing device, serving also as a supporter; the same being composed of two pieces, a main piece 7 cut out to a pattern which, roughly speaking, may be said to be U-shape, and an open-work or perforated piece of fabric or other flexible material 8 constituting a ventilating member. The closed end of the U is shaped to conform to the front half of the crotch portion of the garment so that it may be stitched at its edges to the garment along the seam 5 and along the front lower portions of the leg openings. The arms 9 and 10 of the part 7 are of strap-like configuration, and they are crossed about midway between their lengths and fastened together by lines of stitching 11. The part 8 is preferably an oval which forms a closure for an opening left in the piece 7 between the lower ends of the crossed arms or straps. The member 7 being originally flat, it follows that the lower end becomes more or less dished when the arms 9 and 10 are crossed over each other. The ventilating piece 8 may be made large enough so that when stitched to the member 7 around its entire periphery, as indicated at 12, it will adapt itself more or less to the curvature of the dished portion of the surrounding material. The overall length of the preformed reinforcing element or supporter is approximately the same as the length of the garment from the bottom seam 5 to the waist band 6. Therefore, when the reinforcing member is placed against the inner side of the front wall or section of the garment, with its straight lower edge 13 registering with the seam 5, the free ends of the arms or straps reach to the waist band. In assembling the reinforcing member in the garment, it is so placed that the concave side faces toward the rear. Having been laid against the inner side of the front wall or section 3 of the garment, the supporter is secured by stitching along the lower edge 13 and along the adjacent side edges 14 and 15 which conform to the corresponding portions of the part 3 of the garment adjacent to the leg openings. Lines of stitching are then run along the edges 16 and 17 of the arm or strap portions, the stitches extending through the front wall or section 3 of the garment; these two lines of stitching continuing from the two leg openings to the waist band, as indicated at 18 and 19. The edges 20 and 21 of the straps or arms from their upper ends down to the opening or window covered by the ventilating piece 8 are also stitched to the front of the garment, as indicated by the lines of stitching 22 and 23.

It will thus be seen that not only does the supporter itself serve as a tension member hung from the waist band of the garment, but the more or less diagonal lines of stitching constitute further comparatively non-elastic connections between the crotch portion of the garment and the waist band.

If nothing further were done to the garment, it would contain a ventilated supporter, but the ventilated section in the latter would be covered by part 3 of the garment itself. In other words, the garment proper remains unventilated even though it contains a ventilated supporter. To remedy this, I cut away so much of the material in the front wall or section 3 of the garment as lies in front of the perforated member 8 and run a line of stitching 24 through the front wall of the garment and the perforated member along the periphery of the latter. Thus, there remains only a single layer of material in the central lower portion of the front wall of the garment, and this material is of an open-work or perforated type. It therefore follows that if the entire piece 7 constituting the body of the supporter were removed, leaving only the section 8, the garment that remained would still retain its ventilating means. In short, the section 8 may be regarded as being a part of either the garment proper or of the supporter and adapted for use in a garment with or without a supporter.

It will be seen that when the garment is right side out, as in Fig. 1, no part of the reinforcing means or supporter, proper, is visible except a few neat lines of stitching, and the garment, when worn, presents a very neat appearance. At the same time the garment contains a sturdy, pouch-like supporter hung from the waist band and reinforcing the entire front of the garment against stretching in the vertical direction. However, although there is no break in the supporter, a large section thereof is sufficiently open to afford adequate ventilation which is lacking in the ordinary garment which has a reinforcing lining in the front thereof.

Furthermore, in the manufacture of the garment, the best practices in garment making and supporter making may be carried out; for the garment proper and the supporter may be manufactured independently of each other and be united by stitching along all of the edges of the supporter, from the waist band at the top to and across the crotch; the ventilating section being either a part of the garment proper or of the supporter.

In Figs. 5, 6 and 7, I have illustrated a modification in which the reinforcing member consists simply of two strap-like pieces 30 and 31 crossing each other in the manner of a letter X; thus differing somewhat from the support shown in the other form in which the lower ends of the straps are joined together due to the fact that the straps constitute the arms of a U-shaped element. The crossing point of the members 30 and 31 is also somewhat lower down than the corresponding point in the first form. The ventilating section 32 not only fills the space between those parts of the straps corresponding to the lower ends of the arms or legs 9 and 10 in the first form, but it extends clearly down to the seam 5 which joins together the front and rear sections 3 and 2 at the crotch. In order that the seam 5 will not be visible from the front, the front section 3 of the garment is preferably made sufficiently long so as to bring the same on the rear side of the garment, as shown in Fig. 5. Also, to cause the supporter shape to be retained, the lower edge of the ventilating section 32 is preferably curved or convex, as indicated at 33 in Fig. 7; the sewing of this curved edge to the lower straight edge of the back section of the garment giving a pouch-like form to the ventilating section.

In this modified construction the elements 30, 31 and 32 may, of course, be united in a preformed unit which is then stitched to the garment or to the front wall or section of the garment before the front and rear sections are united; or the assembling of the various parts of the garment proper and of the reinforcing and ventilating elements may be carried out in any other suitable or desired way. In the completed garment, however, the ventilating section may be regarded as forming a part of the front wall of the garment or of the support, or as being a section common to the support and the front wall of the garment.

While I have illustrated and described with particularity only a single preferred form of my invention as applied to a garment which is an undergarment of the trunk type, I do not desire to be limited to the exact structural details thus illustrated and described; but intend to cover all forms and arrangements which come within the definitions of my invention constituting the appended claims.

I claim:

1. A supporter adapted to be stitched to the front of a garment designed to encase the lower part of a human body and extend from the crotch to the waist comprising a main piece of flexible material of U-shape the arms of which are crossed between their ends, and a piece of flexible open-work material covering the opening embraced by the closed end of the U and the parts of the arms of the latter below the point of crossing and stitched at the margin to the main piece of material.

2. The combination with a garment adapted to sheathe the lower part of the body of the wearer and having a crotch, of a reinforcing member comprising a U-shaped piece of fabric lying inside the front of the garment and extending upwardly from the crotch, the arms of the U being crossed between the ends, said piece of fabric being stitched to the garment along the outer edges, and a piece of open-work material extending a cross and covering the opening in the U below the crossing point of the arms of the latter and stitched along its entire edge to the fabric of the U-shaped piece only.

3. The combination with a garment adapted to sheathe the lower part of the body of the wearer and having a crotch, of a reinforcing member comprising a U-shaped piece of flexible material lying inside and stitched along the edges to the front wall of the garment and extending upwardly from the crotch, the arms of the U being crossed between their ends and producing with the closed end of the U an opening surrounded by the flexible material, the front wall of the garment being cut away to provide an opening registering with the opening in the reinforcing member, and a piece of open-work fabric extending across and forming a common cover for both of said openings.

4. A garment adapted to sheathe the lower part of the body of the wearer and having a crotch portion, a pair of strap-like reinforcing pieces secured along their edges in the form of an X to the front wall of the garment and extending from the crotch to the waist, and a ventilating piece set into the front wall of the garment and filling the angle between the reinforcing pieces below their point of crossing.

5. A garment adapted to sheathe the lower part of the body of the wearer and having a waist band, leg openings, and a crotch portion between the leg openings, a pair of strap-like reinforcing pieces secured along their edges in the form of an X to the front wall of the garment and extending from the crotch to the waist band, and a ventilating piece set into the front wall of the garment and filling the angle between the reinforcing pieces below their point of crossing.

6. A garment adapted to sheathe the lower part of the body of the wearer and having a waist band, leg openings, and a crotch piece between the leg openings; and a pair of strap-like reinforcing pieces secured along their edges in the form of an X to the front wall of the garment and extending from the crotch at the leg openings to the waist band.

7. A garment adapted to sheathe the lower part of the body of the wearer and having leg openings separated by a crotch piece, and a pair of strap-like reinforcing pieces secured along their edges in the form of an X to the front wall of the garment and extending from the crotch at the leg openings to the waist.

8. In a garment of a type that has a crotch and is adapted to sheathe the lower part of the body of the wearer, a waist band, a pair of strap-like reinforcing pieces secured in the form of an X to the front wall of the garment and extending from the crotch to the waist band, and a separately formed piece of material constituting a portion of the front wall of the garment filling the angle between the reinforcing pieces below their point of crossing and secured to the remainder of said front wall.

9. In a garment of a type that has a crotch and is adapted to sheathe the lower part of the body of the wearer, a waist band, a pouch-like supporting piece set into the central lower portion of the front wall of the garment, and a pair of strap-like reinforcing pieces secured in the form of an X to the front wall of the garment and extending from the crotch to the waist band along the side edges of said supporting piece.

10. In a garment of a type that has a crotch and is adapted to sheathe the lower part of the body of the wearer, a pair of strap-like reinforcing pieces secured in the form of an X to the front wall of the garment and extending from the crotch to the waist.

HERMAN M. McDONALD.